United States Patent
Tada et al.

(10) Patent No.: US 10,493,360 B2
(45) Date of Patent: Dec. 3, 2019

(54) IMAGE DISPLAY DEVICE AND IMAGE DISPLAY SYSTEM

(71) Applicant: NURVE, Inc., Tokyo (JP)

(72) Inventors: Hideki Tada, Tokyo (JP); Reishi Oya, Tokyo (JP)

(73) Assignee: NURVE, Inc., Tokyo (JP)

( * ) Notice: Subject to any disclaimer, the term of this patent is extended or adjusted under 35 U.S.C. 154(b) by 0 days.

(21) Appl. No.: 16/246,604

(22) Filed: Jan. 14, 2019

(65) Prior Publication Data

US 2019/0143211 A1 May 16, 2019

Related U.S. Application Data

(63) Continuation of application No. PCT/JP2017/025785, filed on Jul. 14, 2017.

(30) Foreign Application Priority Data

Jul. 15, 2016 (JP) .................................. 2016-140751

(51) Int. Cl.
*A63F 13/428* (2014.01)
*G06T 19/00* (2011.01)
(Continued)

(52) U.S. Cl.
CPC .......... *A63F 13/428* (2014.09); *A63F 13/211* (2014.09); *A63F 13/35* (2014.09);
(Continued)

(58) Field of Classification Search
CPC ...... A63F 13/655; G06T 19/20; G02B 27/225
See application file for complete search history.

(56) References Cited

U.S. PATENT DOCUMENTS 5,850,352 A * 12/1998 Moezzi ................ H04N 13/139
 345/419
6,514,083 B1 * 2/2003 Kumar .................. G10H 1/365
 386/285
(Continued)

FOREIGN PATENT DOCUMENTS

| CN | 104007946 A | 8/2014 |
| CN | 104168315 A | 11/2014 |

(Continued)

OTHER PUBLICATIONS

International Search Report issued in PCT/JP2017/025785 dated Aug. 15, 2017, with English Translation (5 pages).
(Continued)

*Primary Examiner* — Reginald A Renwick
(74) *Attorney, Agent, or Firm* — Nakanishi IP Associates, LLC

(57) ABSTRACT

An image display device is provided with: a data obtaining unit that obtains data from a server via a communication network; a display unit; a display control unit that controls image display in the display unit; a position and orientation determining unit that determines a position change and an orientation of the image display device; a position-related information generating unit that generates and transmits information related to a position and an orientation based on the determination result; and a position-related information obtaining unit that obtains information related to a position and an orientation transmitted from another image display device, wherein the display control unit causes the display unit to display an image based on the data obtained from the server and adapts the image based on the determination result of the position and orientation determining unit, and further causes the display unit, based on the information related to a position and an orientation transmitted from the another image display device, to display information related (Continued)

to an image displayed on the image display device that transmitted the information related to a position and an orientation.

14 Claims, 13 Drawing Sheets

(51) Int. Cl.
*G06F 3/01* (2006.01)
*A63F 13/211* (2014.01)
*A63F 13/52* (2014.01)
*A63F 13/35* (2014.01)

(52) U.S. Cl.
CPC .............. *A63F 13/52* (2014.09); *G06F 3/01* (2013.01); *G06T 19/00* (2013.01); *A63F 2300/8082* (2013.01)

(56) References Cited

U.S. PATENT DOCUMENTS

| | | | |
|---|---|---|---|
| 2008/0126568 | A1 | 5/2008 | Otoshi et al. |
| 2012/0249416 | A1 | 10/2012 | Maciocci et al. |
| 2014/0364208 | A1 | 12/2014 | Perry |

FOREIGN PATENT DOCUMENTS

| | | |
|---|---|---|
| CN | 104470599 A | 3/2015 |
| JP | 2002-149581 A | 5/2002 |
| JP | 2004-061783 A | 2/2004 |
| JP | 2005-049996 A | 2/2005 |
| WO | 2006/043473 A1 | 4/2006 |

OTHER PUBLICATIONS

Written Opinion of International Searching Authority issued in PCT/JP2017/025785 dated Aug. 15, 2017, with English Translation (9 pages).
Decision to Grant Patent issued in Japanese Patent Application No. 2018-527690 dated Sep. 4, 2018, with English Translation (6 pages).
Koji Yumoto et al., Technical report of IEICE, Sep. 25, 2008, vol. 108, No. 226, p. 79-84, ISSN 0913-5685, with English Translation (15 pages).
Minoru Kobayashi et al., Image Laboratory, Dec. 2002, vol. 13, No. 12, p. 29-33, ISSN 0915-6755, with English Translation (10 pages).
Tadashi Nezu, Nikkei Electronics, Sep. 29, 2014, No. 1144, p. 28-35, ISSN 0385-1680, with English Translation (16 pages).
Office Action issued in Chinese Patent Application No. 201780043448.3 dated Jun. 4, 2019 (28 pages).
Search Report issued in Chinese Patent Application No. 201780043448. 3, dated May 24, 2019 (5 pages).
Supplementary European Search Report issued in European Patent Application No. EP17827751, dated Sep. 9, 2019 (3 pages).
Extended European Search Report issued in European Patent Application No. EP17827751, dated Sep. 9, 2019 (9 pages).
Pick Sebastian et al: "A 3D collaborative virtual environment to integrate Immersive virtual reality into factory planning processes", 2014 International Workshop on Collaborative Virtual Environments (3DCVE), IEEE, Mar. 30, 2014, pp. 1-6, XP033180617.
Chenechal Morgan Le et al: "When the giant meets the ant an asymmetric approach for collaborative and concurrent object manipulation in a multi-scale environment", 2016 IEEE Third VR International Workshop on Collaborative Virtual Environments (3DCVE), IEEE, Mar. 20, 2016, pp. 18-22, XP032958799.
Suomela R et al: "A system for evaluating augmented reality user interfaces in wearable computers", Wearable Computers, 2001. Proceedings. Fifth International Symposium on Oct. 8-9, 2001, Piscataway, NJ, USA, IEEE, Oct. 8, 2001, pp. 77-84, XP010565639.
Ben Kuchera: "How Job Simulator created a perfect way to spectate, and stream, from within VR", Internet Citation, Mar. 30, 2016, XP002770982, Retrieved from the Internet: URL:https://www.polygon.com/2016/3/30/11330766/job-simulator-vive-twitch-youtube.

\* cited by examiner

IMAGE DISPLAY DEVICE AND IMAGE DISPLAY SYSTEM

CROSS-REFERENCE TO RELATED APPLICATION(S)

This application is a continuation application of PCT international application No. PCT/JP2017/025785, filed on Jul. 14, 2017, which designated the United States, and which claims the benefit of priority from Japanese Patent Application No. 2016-140751, filed on Jul. 15, 2016. The entire contents of these applications are incorporated herein by reference.

BACKGROUND OF THE INVENTION

Field of the Invention

The present invention relates to image display technique involving a plurality of image display devices connected by means of a communication network.

Description of the Related Art

In recent years, the display technique of virtual reality (hereinafter also referred to as "VR") has been utilized in various fields including games, entertainment, learning support, vocational training, and others. In VR, spectacle-type or goggle-type display devices referred to as head-mounted displays (hereinafter also referred to as "HMDs") are typically used. Users can appreciate stereoscopic images by wearing the HMDs on their heads and looking at a screen built into the HMDs with both eyes. Gyroscope sensors and acceleration sensors are embedded in the HMDs and images displayed on the screen change depending on the movement of the users' heads detected by these sensors. This allows users to have an experience as if they are in a three-dimensionally displayed image (virtual space).

As a technique related to VR, JP2004-61783 A, for example, discloses a language teaching device in which: a server, a computer for an educator and a plurality of computers for learners are connected by means of a line, such as the Internet; a character video and a background video, which are virtual three-dimensional videos, are provided from the server to the learners; these videos are played as a three-dimensional virtual reality environment; and, on the educator side, the display and output are made with the same view point as that of the learners and also by associating the learners and the educator with a computer graphic video. In this JP2004-61783 A, a three-dimensional video of an assembly-type classroom is reproduced by making the educator and the learners wear head-mounted displays and headphones with microphones, thereby allowing them to learn in an atmosphere with a sense of realism.

BRIEF SUMMARY OF THE INVENTION

An aspect of the present invention relates to an image display device to be used in an image display system. The image display system is provided with a plurality of image display devices and a server that delivers data for causing the plurality of image display devices to display images via a communication network, wherein the server stores terminal information that is information for identifying each of the plurality of image display devices and setting information for causing two or more image display devices out of the plurality of image display devices to cooperate. The image display device is provided with: a data obtaining unit that obtains the data from the server; a display unit that displays an image based on the data; a display control unit that controls image display in the display unit; a position and orientation determining unit that determines a position change and an orientation of the image display device; a position-related information generating unit that generates and transmits information related to a position and an orientation of the image display device based on a result of determination made by the position and orientation determining unit; and a position-related information obtaining unit that obtains information related to a position and an orientation of at least one image display device, other than the image display device, out of the two or more image display devices that are caused to cooperate based on the setting information, the information being transmitted from the at least one image display device. The display control unit causes the display unit to display an image based on the data obtained by the data obtaining unit and adapts the image in accordance with a position and an orientation of the image display device based on a result of determination made by the position and orientation determining unit, and further causes the display unit, based on the information related to a position and an orientation obtained by the position-related information obtaining unit, to display information related to an image displayed on an image display device that transmitted the information related to a position and an orientation.

Another aspect of the present invention relates to an image display system. The image display system is provided with: a plurality of image display devices; and a server that delivers data for causing the plurality of image display devices to display images via a communication network. The server includes: a storage unit that stores the data; a database that stores terminal information that is information for identifying each of the plurality of image display devices and setting information for causing two or more image display devices out of the plurality of image display devices to cooperate; and a data delivery unit that performs synchronous delivery of the data to the two or more image display devices that are caused to cooperate based on the setting information. Each of the plurality of image display devices includes: a data obtaining unit that obtains the data from the server; a display unit that displays an image based on the data; a display control unit that controls image display in the display unit; a position and orientation determining unit that determines a position change and an orientation of the image display device; a position-related information generating unit that generates and transmits information related to a position and an orientation of the image display device based on a result of determination made by the position and orientation determining unit; and a position-related information obtaining unit that obtains information related to a position and an orientation of at least one image display device, other than the image display device, out of the two or more image display devices that are caused to cooperate based on the setting information, the information being transmitted from the at least one image display device. The display control unit causes the display unit to display an image based on the data obtained by the data obtaining unit and adapts the image in accordance with a position and an orientation of the image display device based on a result of determination made by the position and orientation determining unit, and further causes the display unit, based on the information related to a position and an orientation obtained by the position-related information obtaining unit, to display information related to an image displayed on an image display device that transmitted the information related to a position and an orientation.

Another aspect of the present invention relates to an image display system. The image display system is provided with: at least one first image display device; at least one second image display device that is different from the first image display device; and a server that delivers data for causing the at least one first and second image display devices to display images via a communication network. The server includes: a storage unit that stores the data; a database that stores terminal information that is information for identifying each of the at least one first and second image display devices and setting information for causing two or more image display devices out of the at least one first and second image display devices to cooperate, the two or more image display devices including one of each of at least first and second image devices, and a data delivery unit that performs synchronous delivery of the data to the two or more image display devices that are caused to cooperate based on the setting information. The at least one first image display device includes: a first data obtaining unit that obtains the data from the server; a first display unit that displays an image based on the data; a first display control unit that controls image display in the first display unit; a position and orientation determining unit that determines a position change and an orientation of the first image display device; and a position-related information generating unit that generates and transmits information related to a position and an orientation of the first image display device based on a result of determination made by the position and orientation determining unit. The at least one second image display device includes: a second data obtaining unit that obtains the data from the server; a second display unit that displays an image based on the data; a second display control unit that controls image display in the second display unit; and a position-related information obtaining unit that obtains information related to a position and an orientation of a first image display device that is included in the two or more image display devices that are caused to cooperate based on the setting information, the information being transmitted from the first image display device. The first display control unit causes the first display unit to display an image based on the data obtained by the first data obtaining unit and adapts the image in accordance with a position and an orientation of the first image display device based on a result of determination made by the position and orientation determining unit. The second display control unit causes the second display unit to display an image based on the data obtained by the second data obtaining unit and causes the second display unit, based on the information related to a position and an orientation obtained by the position-related information obtaining unit, to display information related to an image displayed on the first image display device that transmitted the information related to a position and an orientation.

The above-described, or other features, advantages and technical and industrial significance of the present invention, will be better understood by reading the following detailed description of the preferred embodiments of the present invention while considering the attached drawings.

DETAILED DESCRIPTION OF THE INVENTION

Figure 1:
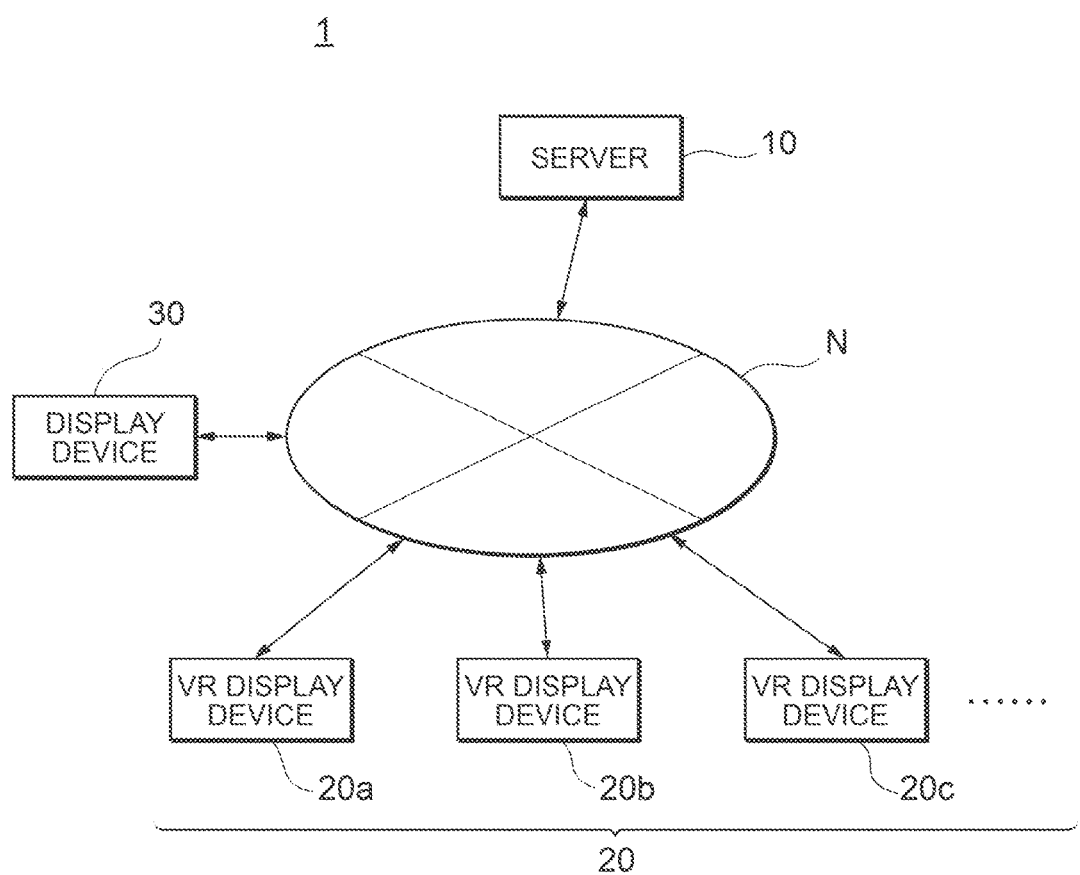
FIG. 1 is a schematic diagram showing a schematic configuration of an image display system according to an embodiment of the present invention.

The image display device and the image display system according to an embodiment of the present invention will be described hereinafter with reference to the drawings. It should be noted that the present invention is not limited by the embodiment. In the descriptions of the respective drawings, the same parts are indicated by providing the same reference numerals.

Embodiment

FIG. 1 is a schematic diagram showing a schematic configuration of the image display system according to an embodiment of the present invention. As shown in FIG. 1, the image display system 1 according to the present embodiment is provided with: a server 10 that distributes various types of data for displaying a still image or video (hereinafter these are collectively referred to as "content"), which are to be viewed by a user; virtual reality (hereinafter referred to as "VR") display devices 20a, 20b, . . . that display an image based on the data received from the server 10; and a display device 30. It should be noted that only one display device 30 is shown in FIG. 1; however, a plurality of display devices 30 may be provided. The server 10, the plurality of VR display devices 20 and the display device 30 are connected to each other via a communication network N. Hereinafter, the plurality of VR display devices 20a, 20b, . . . will also be collectively referred to as the VR display device 20. Moreover, the VR display device 20 and the display device 30 may also be collectively referred to as a display terminal.

Here, recently, an attempt has been made to enable a plurality of users to share the atmosphere of a place along with VR, not only by allowing the users to individually experience VR but also by allowing the users to experience VR simultaneously in one and the same real-life space. Specific examples include: watching a VR concert at a real-life live show venue; watching VR sport in a real-life stadium; and allowing a family visiting a real estate agent to preview a property through VR. In these cases, it is expected that the sense of realism of VR is even further enhanced by accompanying persons and users who happen to be at the same venue sharing the atmosphere of the place among themselves.

However, as the users' view of the real-life space is blocked while wearing a personalized display device, such as an HMD, they are scarcely able to grasp the positions and face directions of other users in the same real-life space. Therefore, even when, for example, a plurality of users simultaneously see the same virtual space, it is difficult to grasp what the other users are paying attention to within the virtual space. Accordingly, a problem arises where communication with the other users is difficult due to the fact that, for example, there is a communication gap between the users sitting next to each other and that the same topic cannot be shared when a neighboring user exclaims in admiration but another user has no idea what the neighboring user is admiring about even when they are in the same real-life environment. As a consequence, a gap arises between the virtual space scene happening in front of the user's eyes and the communication with others in the real-life space, and this may, in turn, be likely to reduce the sense of immersion in VR.

The present embodiment enable communication between users who are viewing images with personalized display devices, such as HMDs.

Referring back to FIG. 1, as for the communication network N, a telecommunication line, such as an Internet connection, a telephone line, a LAN, a dedicated line, a mobile body communication network, Wi-Fi (Wireless Fidelity), Bluetooth (Registered trademark), or a combination thereof may be used. The communication network N may be a wired or wireless network, or may be a combination thereof.

Figure 2:
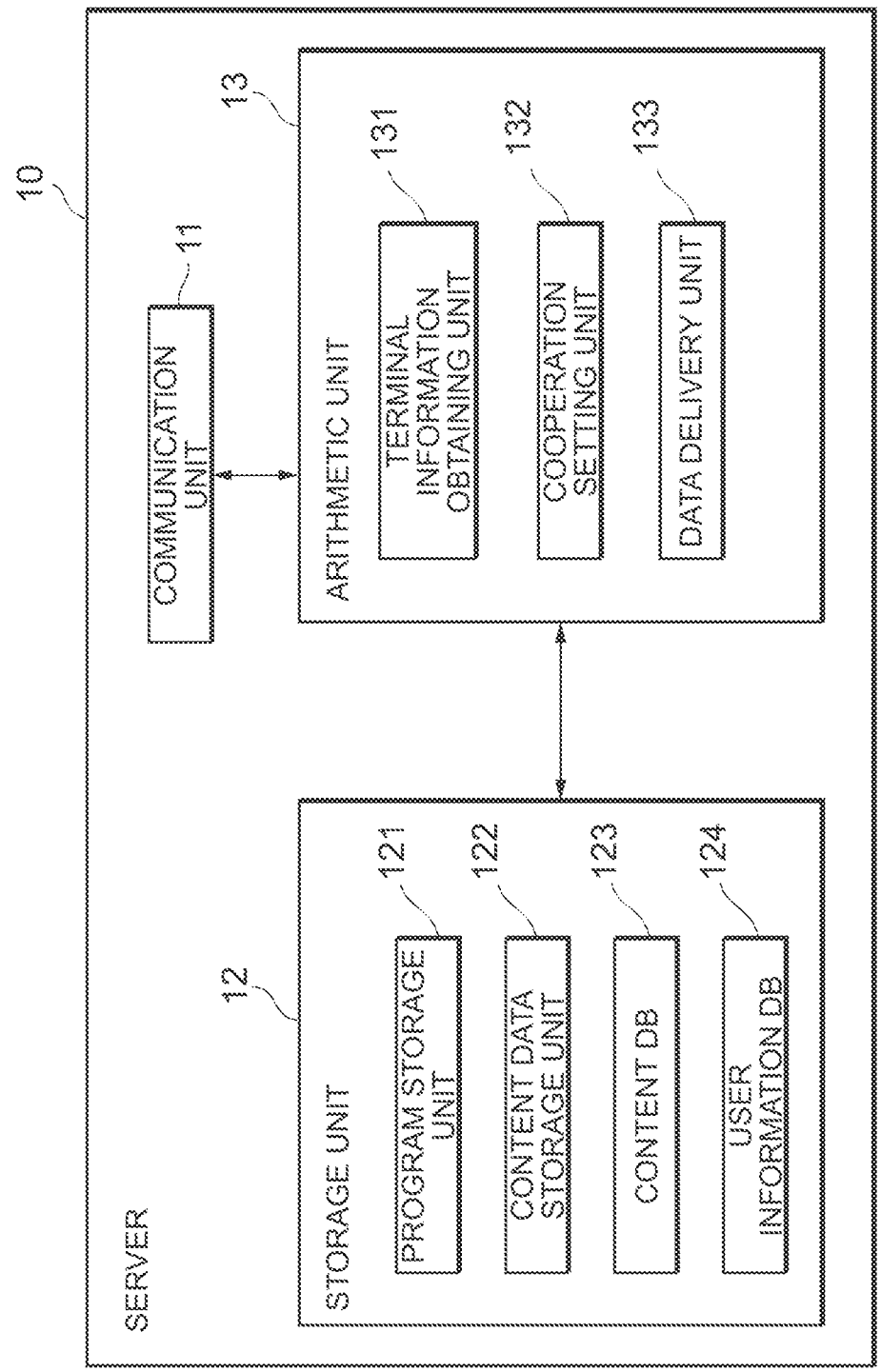
FIG. 2 is a block diagram showing a schematic configuration of a server shown in FIG. 1.

FIG. 2 is a block diagram showing a schematic configuration of the server 10 shown in FIG. 1. Here, the server 10 does not necessarily need to be configured by a single computer and the server 10 may, for example, be configured by a plurality of computers connected to the communication network N. As shown in FIG. 2, the server 10 is provided with a communication unit 11, a storage unit 12 and an arithmetic unit 13.

The communication unit 11 is an interface that connects the server 10 to the communication network N and that performs communication with other devices connected to the communication network N. The communication unit 11 is configured with, for example, a software modem, a cable modem, a wireless modem, an ADSL modem or the like.

The storage unit 12 is a computer-readable storage medium, such as a semiconductor memory, for example ROM or RAM, or a hard disk, and includes a program storage unit 121, a content data storage unit 122, a content database (DB) 123 and a user information database (DB) 124.

The program storage unit 121 stores, in addition to an operating system program and a driver program, application programs that execute various functions, various parameters that are used during execution of these programs, and the like. In particular, the program storage unit 121 stores a program that causes the arithmetic unit 13 to execute a sequence of operations wherein, by performing synchronous delivery to the plurality of VR display devices 20 and the display device 30 of various types of data for causing them to display an image, these display terminals are caused to display VR in a synchronized manner.

The content data storage unit 122 stores data for causing the VR display devices 20 and the display device 30 to display various contents, such as VR that reproduces a three-dimensional image with a stereoscopic effect (i.e. the virtual space) and a video with a 360-degree angle of field. Specific examples include: image data for displaying a two-dimensional or three-dimensional image (a still image or a video); modeling data (for example, polygon data) for configuring computer graphics (hereinafter referred to as "CG"); audio data, such as sound effects, or the like, to be output with an image or CG; and others. The polygon data here refers to data that represents elements used when reproducing an object by combining polygons, such as triangles, squares, etc. in CG. Hereinafter, the image data, modeling data for CG and audio data, etc. used for reproducing content in the VR display device 20 or the display device 30 will be collectively referred to as content data.

The content database 123 stores various types of information for managing content data stored in the content data storage unit 122. In particular, identifiers for identifying content, addresses that indicate storage areas of various types of content data in the content data storage unit 122, and the like, are stored.

The user information database 124 stores information relating to the user who utilizes the image display system 1. In particular, a user ID for identifying a user, a passcode for authentication, terminal information for identifying the display terminal used by the user, and the like, are stored.

In addition, the user information database 124 stores setting information for causing the display terminals used by the users to cooperate with each other. Here, the cooperation means that, by performing synchronous content data delivery of the content having a common identifier from the server 10, the same image is displayed at the same timing on the plurality of display terminals and information relating to the position and orientation, etc. of each other is shared among the plurality of display terminals while the image is displayed. It should be noted that the expression "the same timing" or "simultaneously" herein includes an error in the order of a delay time that occurs when delivering the content data. The user information database 124 performs a terminal device group setting with respect to the terminal information of the terminal devices that are to cooperate with each other by adding a flag that indicates the intention to cooperation.

The information stored in the content database 123 and the information stored in the user information database 124 can be added, changed or deleted as needed by an administrator of the server 10 operating the server 10 or accessing the server 10 via the communication network N from a separate computer. The setting information for causing the display terminals to cooperate with each other can be changed from the VR display device 20 side.

The arithmetic unit 13 is configured with, for example, a CPU (Central Processing Unit) or a GPU (Graphics Processing Unit), and controls various units of the server 10 in an integrated manner by reading various programs stored in the program storage unit 121 and executes various controls for delivering content data to each of the VR display devices 20 and the display device 30. In particular, the arithmetic unit 13 includes a terminal information obtaining unit 131, a cooperation setting unit 132 and a data delivery unit 133.

The terminal information obtaining unit 131 obtains terminal information for identifying the display terminals (the VR display device 20 and the display device 30) when they access the server 10. In the present embodiment, an Internet protocol (IP) address allocated to each display terminal is obtained as the terminal information.

The cooperation setting unit 132 performs setting for causing the display terminals to cooperate with each other based on the information stored in the user information database 124. In particular, when the cooperation setting unit 132 receives requests for content having a common identifier from the plurality of display terminals, the cooperation setting unit 132 transmits, to two or more display terminals among the plurality of display terminals that are set to be in the same group in the user information database 124, each other's terminal information.

When the data delivery unit 133 receives a request for content from a display terminal, the data delivery unit 133 reads out content data corresponding to the requested content from the content data storage unit 122 and delivers the same to the requesting display terminal based on the terminal information obtained by the terminal information obtaining unit 131. It should be noted that the content data delivery method may be a streaming method or a downloading method and may be arbitrarily selected depending on the network conditions.

Figure 3:
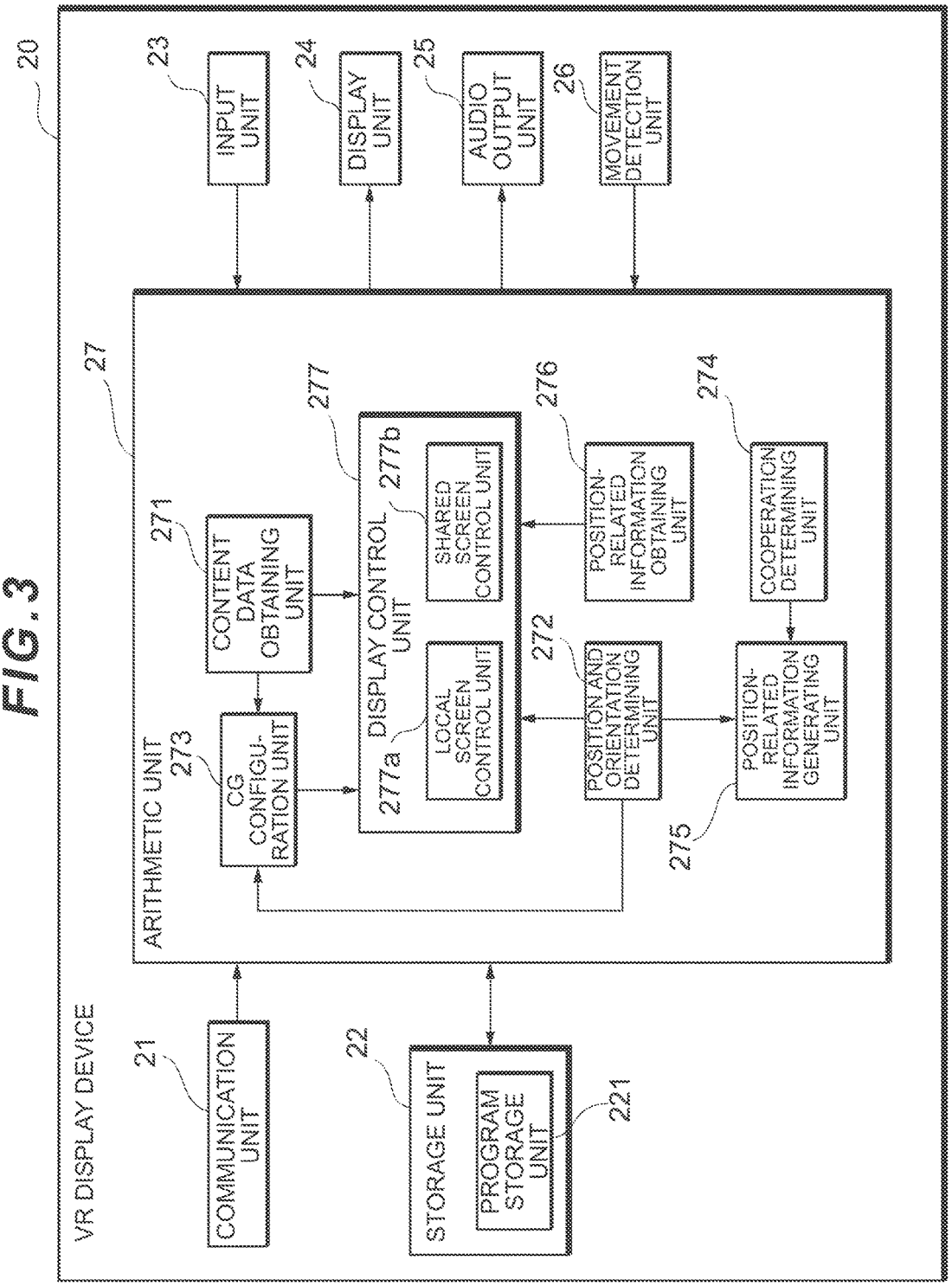
FIG. 3 is a block diagram showing a schematic configuration of a VR display device shown in FIG. 1.

FIG. 3 is a block diagram showing a schematic configuration of the VR display device 20 shown in FIG. 1. The VR display device 20 is an image display device that displays an image based on the content data delivered from the server 10 and is provided with a communication unit 21, a storage unit 22, an input unit 23, a display unit 24, an audio output unit 25, a movement detection unit 26 and an arithmetic unit 27.

Figure 4:
FIG. 4 is a schematic diagram showing the state in which a plurality of users are wearing VR display devices.

FIG. 4 is a schematic diagram showing, as an example, the state in which two users 2a, 2b are respectively wearing VR display devices 20a, 20b. The VR display devices 20 are also referred to as head-mounted displays and, as shown in FIG. 4, are mounted onto the heads of the users 2a, 2b and used such that the right and left eyes of the users are covered. Inside the VR display device 20, two lenses are arranged at positions corresponding to the user's right and left eyes and a display unit 24 is arranged in front of these lenses.

Figure 5:
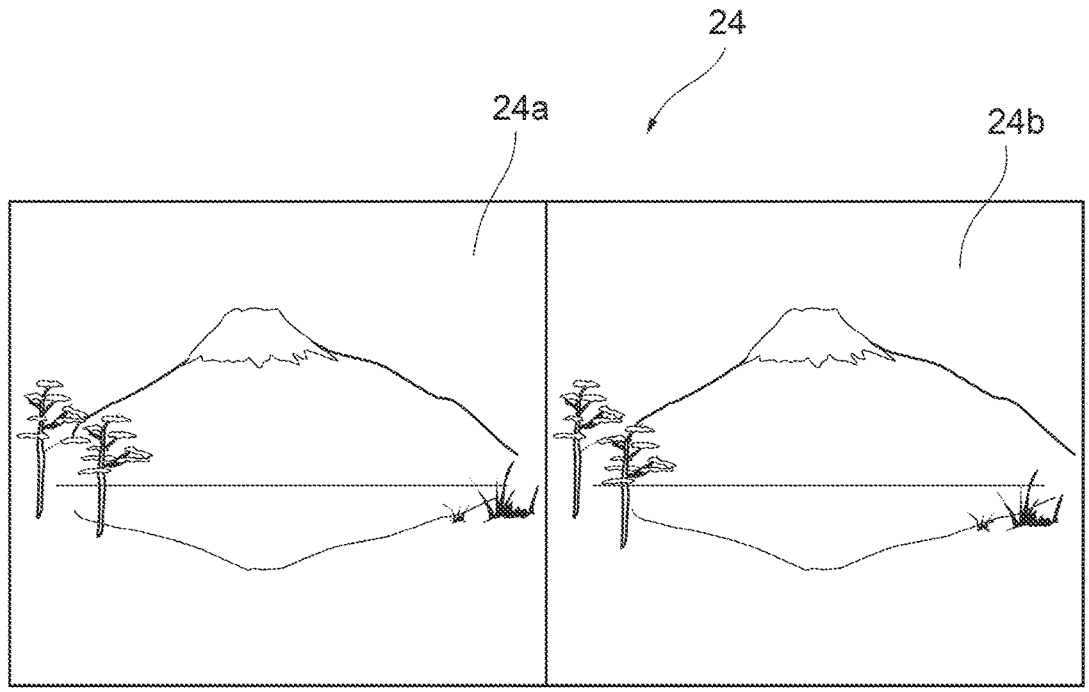
FIG. 5 is a schematic diagram illustrating a screen displayed on a display unit shown in FIG. 3.
Figure 6:
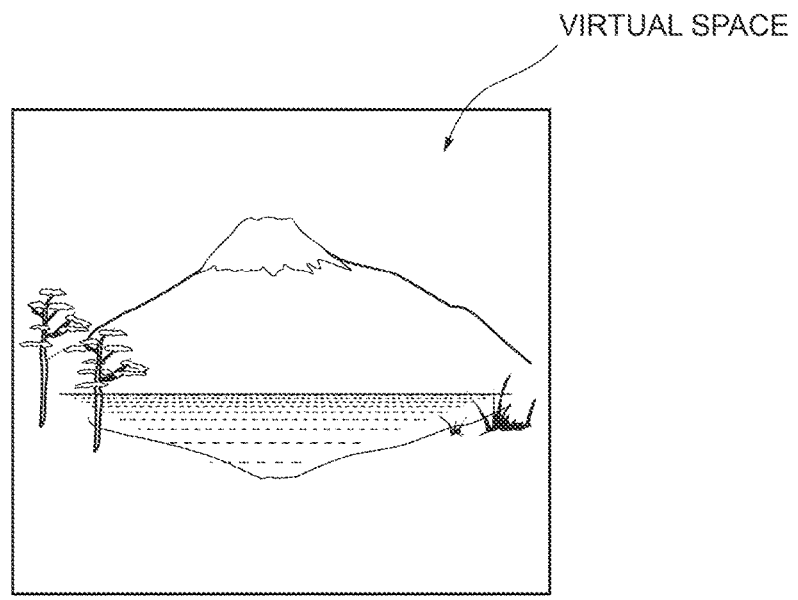
FIG. 6 is a schematic diagram illustrating a virtual space reproduced from the image shown in FIG. 5.

FIG. 5 is a schematic diagram illustrating images displayed on the display unit 24. FIG. 6 is a schematic diagram illustrating a virtual space reproduced from the images shown in FIG. 5. When reproducing a virtual space, as shown in FIG. 5, the screen of the display unit 24 is divided into two regions 24a, 24b and two images provided with parallax with respect to each other are respectively displayed in these regions 24a, 24b. The user can appreciate the virtual space such as shown in FIG. 6 in a three-dimensional manner by respectively looking at the regions 24a, 24b with the right and left eyes via the two lenses built into the VR display device 20.

It should be noted that the VR display device 20 is a device capable of displaying a three-dimensional image through a stereoscopic effect; however, when data for two-dimensional image display is delivered from the server 10 as the content data, as with the general display devices, it displays a two-dimensional image on the display unit 24.

Referring back to FIG. 3, the communication unit 21 is an interface that connects the VR display device 20 to the communication network N and that performs communication with other devices connected to the communication network N. The communication unit 21 is configured with, for example, a software modem, a cable modem, a wireless modem, an ADSL modem or the like.

The storage unit 22 is a computer-readable storage medium, such as a semiconductor memory, for example, ROM or RAM, and the like. The storage unit 22 includes a program storage unit 221 that stores, in addition to an operating system program and a driver program, application programs for displaying images based on the content data delivered from the server 10, various parameters that are used during execution of these programs, and the like. It should be noted that, when the content data is delivered from the server 10 in a downloading method, a content data storage unit that stores content data may be provided in the storage unit 22.

The input unit 23 is an input device, such as an operation button, a slide switch, a touch-sensitive sensor, or the like, and it inputs an instruction signal corresponding to the user input operation to the arithmetic unit 27. It should be noted that the input operation with respect to the VR display device 20 may be made, in addition to by way of using the input unit 23, by a computer, etc. connected directly or via the communication network N to the VR display device 20.

The display unit 24 is a display that includes a display panel formed by, for example, liquid crystal or organic EL (electroluminescence) and a drive unit, and that displays an image under the control of the arithmetic unit 27.

The audio output unit 25 outputs a sound effect, or the like, based on the audio data included in the content data delivered from the server 10.

The movement detection unit 26 includes, for example, a GPS sensor, a gyroscope sensor, an acceleration sensor, or the like, and outputs a detection signal that represents movement of the VR display device 20, in other words, the position change or the orientation thereof.

The arithmetic unit 27 is configured with, for example, a CPU or a GPU, and controls various units of the VR display device 20 in an integrated manner by reading programs stored in the program storage unit 221 and executes various types of arithmetic processing for displaying the image of the content. In particular, the arithmetic unit 27 includes a content data obtaining unit 271, a position and orientation determining unit 272, a CG configuration unit 273, a cooperation determining unit 274, a position-related information generating unit 275, a position-related information obtaining unit 276 and a display control unit 277.

The content data obtaining unit 271 makes a request for content data by transmitting an identifier corresponding to the user-desired content to the server 10 in accordance with the input operation made to the input unit 23 (or the input operation from a directly or indirectly-connected computer, etc.), and then obtains the content data delivered from the server 10.

The position and orientation determining unit 272 determines the position change and the orientation of the VR display device 20 based on the detection signal output from the movement detection unit 26. More specifically, the position and orientation determining unit 272 calculates the displacement and the orientation of the VR display device 20 based on the orientation and magnitude of the acceleration, as well as the orientation and magnitude of the angular acceleration detected by the movement detection unit 26. In this way, the relative coordinates of the VR display device 20 with respect to the original coordinates and the orientation of the VR display device 20 (namely, the position and line of sight of the user) can be identified.

The CG configuration unit 273 performs arithmetic processing for configuring CG according to the position or the line of sight of the user using the modeling data (for example, polygon data) included in the content data delivered from the server 10 and the result of determination made by the position and orientation determining unit 272.

The cooperation determining unit 274 determines whether or not to allow the VR display device 20 (for example, the VR display device 20a) to cooperate with other display terminals (for example, the VR display device 20b or the display device 30) connected via the communication network N.

The position-related information generating unit 275 generates information related to the position and orientation (hereinafter also referred to as "position-related information") of the VR display device 20 (for example, the VR display device 20a) based on the result of determination made by the position and orientation determining unit 272 and transmits the same to the other VR display devices 20 (for example, the VR display device 20b) or the display device 30, which are in cooperation.

The position-related information obtaining unit 276 receives the position-related information transmitted from the other cooperating VR display devices 20 and inputs the same to the display control unit 277.

The display control unit 277 causes the display unit 24 to display an image based on the content data delivered from the server 10 and performs control for adapting the displayed image based on the result of determination made by the position and orientation determining unit 272. More specifically, the display control unit 277 reproduces a virtual space by causing the display unit 24 to display a compound image created by compounding CG configured by the CG configuration unit 273 into the image derived from the image data contained in the content data. The display control unit 277 also changes the position, angle, or the like, of the frame of the image to be displayed on the display part 24 or changes the sense of depth by adapting the parallax between the regions 24a, 24b (see FIG. 5) when it is determined, as the result of the determination made by the position and orientation determining unit 272, that the user has moved or changed his/her line of sight.

The display control unit 277 includes a local screen control unit 277a and a shared screen control unit 277b. The local screen control unit 277a performs, based on the determination result of the position and the orientation of the VR display device 20 (for example, the VR display device 20a), control for displaying an image when the virtual space is seen from the viewpoint of the user (for example, the user 2a) of such VR display device 20.

On the other hand, the shared screen control unit 277b performs, based on the determination result of the position and the orientation of the other VR display device 20 (for example, the VR display device 20b) that is in cooperation with the VR display device 20, control for causing part of the display unit 24 of the VR display device 20 (the VR display device 20a) to display an image when the same virtual space is seen from the viewpoint of the user (for example, the user 2b) of such other VR display device 20.

It should be noted that, as for the VR display device 20, a head-mounted display dedicated for VR, in which the respective function units shown in FIG. 3 are accommodated in a housing and in which a holder for mounting the VR display device 20 onto the user's head is integrated, or a general-purpose display device may be used. The VR display device 20 may be configured, for example, by attaching a general-purpose display device such as a smartphone, a portable digital assistant (PDA), a portable game device, or the like, to the holder for the head-mounted display.

Figure 7:
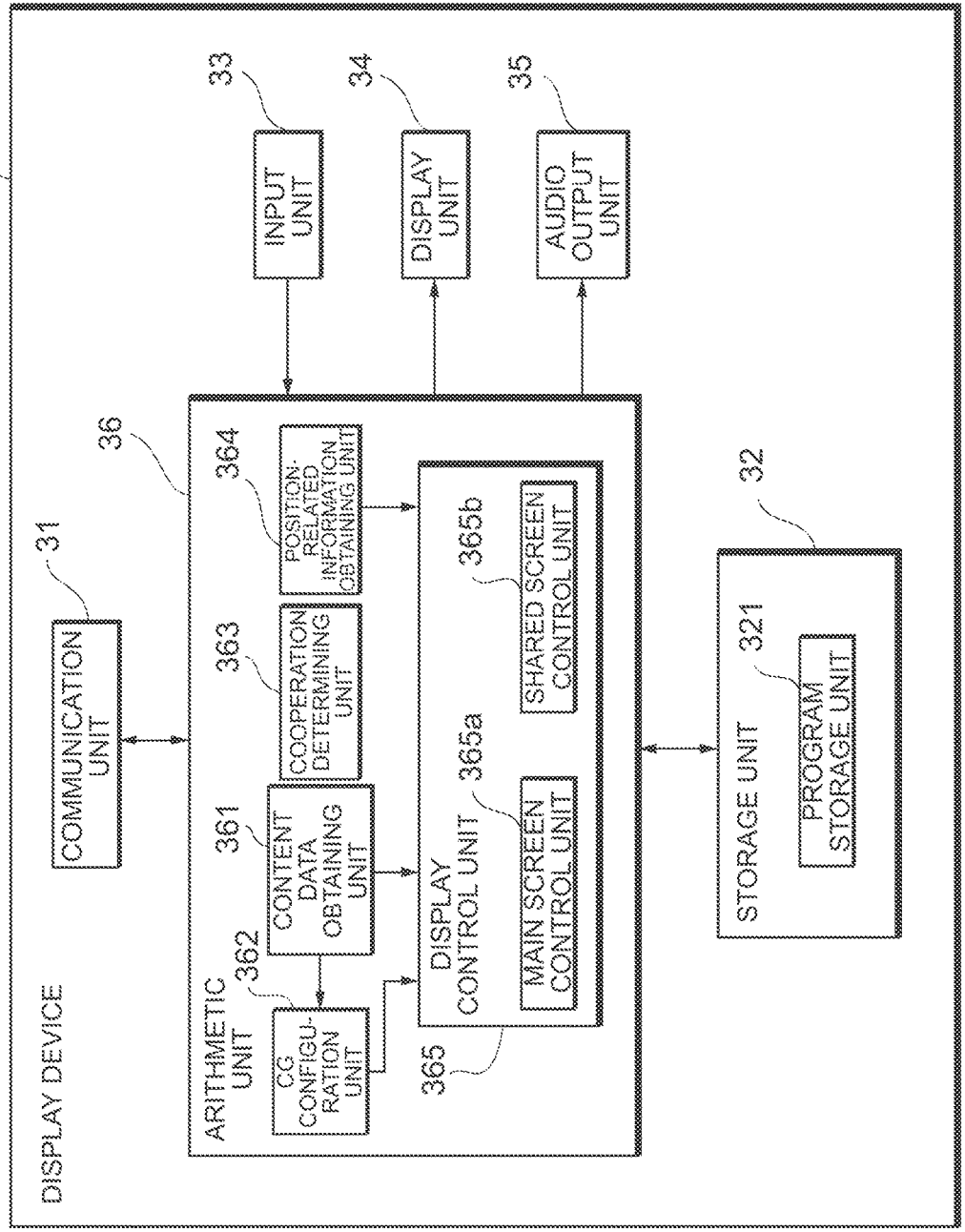
FIG. 7 is a block diagram showing a schematic configuration of the display device shown in FIG. 1.

FIG. 7 is a block diagram showing a schematic configuration of the display device 30 shown in FIG. 1. The display device 30 is, for example, a television set provided with a bi-directional communication function or a secondary image display device with a large-sized screen to be used for public viewing, or the like, and it displays images based on the content data delivered from the server 10.

As shown in FIG. 7, the display device 30 is provided with a communication unit 31, a storage unit 32, an input unit 33, a display unit 34, an audio output unit 35 and an arithmetic unit 36.

The communication unit 31 is an interface that connects the display device 30 to the communication network N and that performs communication with the server 10 and other devices.

The storage unit 32 is a computer-readable storage medium, such as a semiconductor memory, for example, ROM or RAM, and it includes a program storage unit 321 that stores, in addition to an operating system program and a driver program, application programs for displaying images based on the content data delivered from the server 10, various parameters that are used during execution of these programs, and the like. It should be noted that, when the content data is delivered from the server 10 in a downloading method, a content data storage unit that stores the content data may be provided in the storage unit 32.

The input unit 33 is an input device, such as an operation button, a keyboard, a mouse, a touch-sensitive panel, or the like, and it inputs an instruction signal corresponding to the user input operation to the arithmetic unit 36. It should be noted that the input operation with respect to the display device 30 may be made, in addition to by way of using the input unit 33, by a computer, etc. connected directly or via the communication network N to the display device 30.

The display unit 34 is, for example, a liquid crystal display or an organic EL display.

The audio output unit 35 is a speaker that outputs a sound effect, or the like, based on the audio data included in the content data.

The arithmetic unit 36 is configured with, for example, a CPU or a GPU, and controls various units of the display device 30 in an integrated manner by reading various programs stored in the program storage unit 321. In particular, the arithmetic unit 36 includes a content data obtaining unit 361, a CG configuration unit 362, a cooperation determining unit 363, a position-related information obtaining unit 364 and a display control unit 365.

The content data obtaining unit 361 obtains the content data delivered from the server 10.

The CG configuration unit 362 performs arithmetic processing for configuring CG using the modeling data (for example, polygon data) included in the content data delivered from the server 10.

The cooperation determining unit 363 determines whether or not to allow the display device 30 to cooperate with one or more VR display devices 20 connected via the communication network N.

The position-related information obtaining unit 364 receives the position-related information transmitted from the cooperating VR display device 20 and inputs the same to the display control unit 365.

The display control unit 365 causes the display unit 34 to display an image based on the content data delivered from the server 10 and also causes the display unit 34 to display an image based on the position-related information transmitted from the cooperating VR display device 20. The display control unit 365 includes a main screen control unit 365a and a shared screen control unit 365b.

The main screen control unit 365a causes the display unit 34 to display a compound image created by compounding CG configured by the CG configuration unit 362 into the image derived from the image data contained in the content data. The image to be displayed on the display unit 34 may be an image for reproducing a virtual space by allowing a viewer of such display device 30 to wear a pair of polarized glasses for 3D viewing to obtain a stereoscopic effect or an image having such virtual space projected onto a two-dimensional plane or a curved surface.

The shared screen control unit 365b performs, based on the determination result of the position and the orientation of one or more VR display devices 20 in cooperation with the display device 30, control for causing part of the display unit 34 to display an image when the above-described virtual space is seen from the viewpoints of the users of the respective VR display devices 20.

Figure 8:
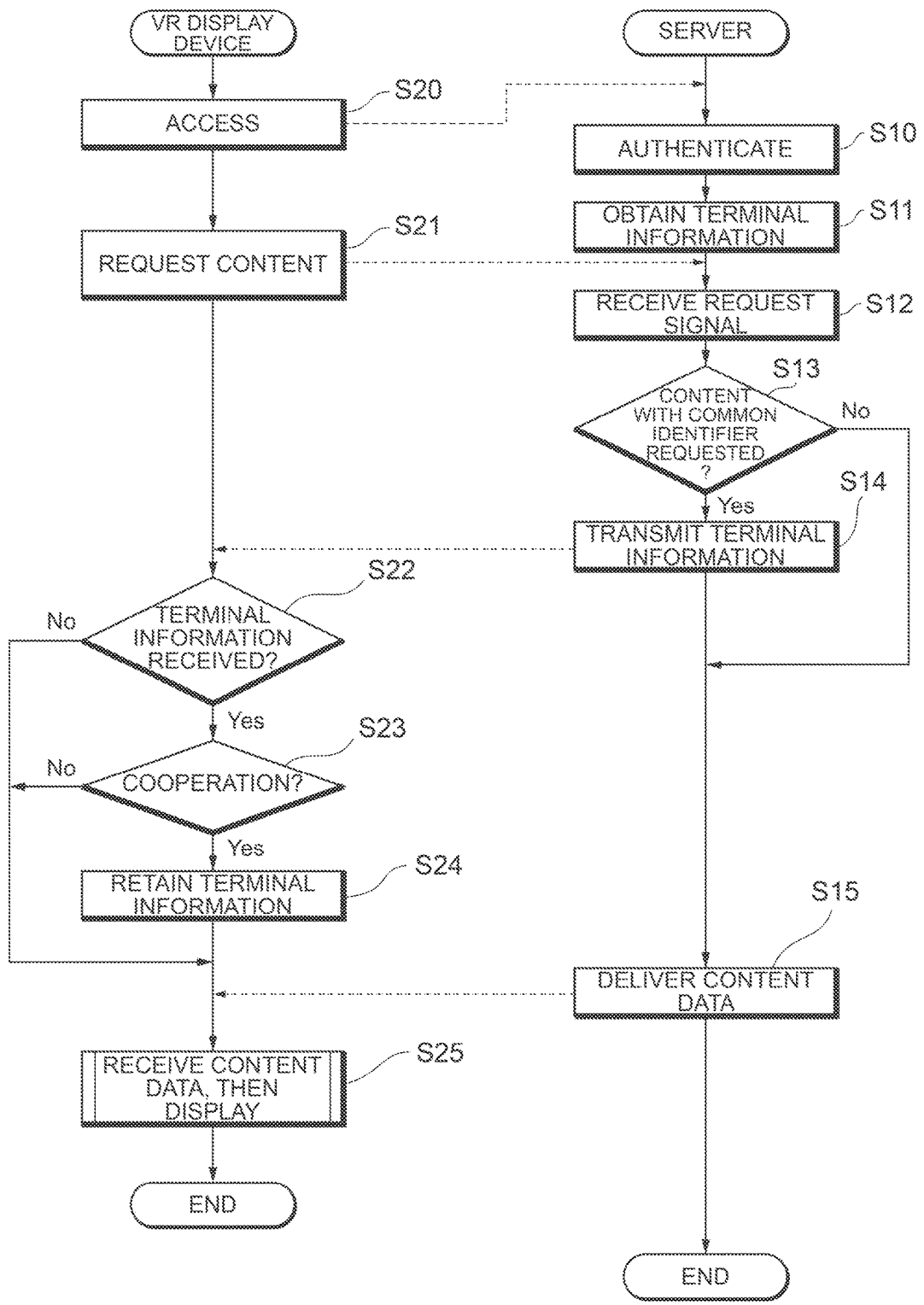
FIG. 8 is a flowchart illustrating the operations of the VR display device and the server shown in FIG. 1.

Next, the operations of the image display system 1 according to the present embodiment will be described. FIG. 8 is a flowchart illustrating the operations of the server 10 and the VR display device 20 in the image display system 1. It should be noted that, in FIG. 8, only the operations of one VR display device 20 are illustrated; however, each of the plurality of VR display devices 20 operates in a parallel manner in accordance with the flow shown in FIG. 8. Hereinafter, a case where the VR display device 20 is caused to display an image for reproducing a three-dimensional virtual space will be described; however, the image to be displayed on the VR display device 20 may be a two-dimensional image or it may be either a video or a still image.

First, in step S20, the VR display device 20 accesses the server 10 and transmits a user ID and a passcode. Then the server 10 performs authentication based on the received user ID and passcode (step S10). When this authentication is successful, the server 10 obtains terminal information (for example, an IP address) of the accessing VR terminal device 20 (step S11).

In step S21, the VR display device 20 makes a request to the server 10 for content. In particular, the VR display device 20 transmits a request signal including an identifier for identifying the user-desired content in accordance with the operation input made by the user.

In step S12, the server 10 receives the content request signal. In the subsequent step S13, the server 10 determines whether or not content with a common identifier is requested from a plurality of VR display devices 20.

When there are requests for the content with a common identifier (step S13: Yes), the server 10 transmits, to the VR display devices 20 which are to be in cooperation with each other, each other's terminal information, out of the plurality of VR display devices 20 that requested the common content (step S14). In other words, each terminal information is transmitted to VR display devices 20 other than the VR display device 20 from which such terminal information is originally obtained. For example, when the VR display devices 20a, 20b shown in FIG. 4 are to cooperate, the server 10 transmits the terminal information of the VR display device 20b to the VR display device 20a and transmits the terminal information of the VR display device 20a to the VR display device 20b.

Here, the VR display devices 20 that are to cooperate may be arbitrarily set at the server 10. As an example, all of the plurality of VR display devices 20 that requested the content with a common identifier may be made to cooperate. As another example, the VR display devices 20 that are pre-set to be in the same group in the user information database 124 (see FIG. 2), out of the plurality of VR display devices 20 that requested the content with a common identifier, may be made to cooperate. It should be noted that, as described below, even when a setting for cooperation is made in the server 10, such cooperation may be rejected on the VR display device 20 side.

On the other hand, when there is no request for content with a common identifier (step S13: No), the operation of the server 10 transitions directly to step S15.

When the VR display device 20 receives terminal information of another VR display device 20 (step S22: Yes), it selects whether or not to cooperate with such another VR display device 20 (step S23). This selection is made in accordance with an operation input by the user.

When the cooperation with such another VR display device 20 is selected (step S23: Yes), in the subsequent step S24, the VR display device 20 retains the terminal information of such another VR display device 20 as a cooperation partner. For example, when a selection is made in the VR display device 20a to cooperate with the VR display device 20b, the VR display device 20a retains the terminal information of the VR display device 20b. It should be noted that, in the VR display device 20, a setting may also be made that the cooperation with another VR display device 20 cannot be rejected, and in such case, the operation of the VR display device 20 transitions directly to step S24 after step S22.

On the other hand, in step S22, when the terminal information of another VR display device 20 is not received (step S22: No) or, in step S23, when the cooperation with another VR display device 20 is not selected (step S23: No), the operation of the VR display device 20 transitions directly to step S25.

In step S15, the server 10 delivers the content data of the requested content to the requesting VR display device 20. At this time, the server 10 performs synchronous delivery of the common content data to the plurality of cooperating VR display devices 20. In response, the VR display device 20 receives the content data and displays an image based on the received content data (step S25). It should be noted that, when the content data is delivered in a streaming method, the reception of the content data and the image display based on such content data are performed in parallel in the VR display device 20. Thereafter, the operations of the server 10 and the VR display device 20 terminate.

Next, the display processing in step S25 will be described in more detail. When the cooperation is not selected in step S23, in other words, when the VR display device 20 (for example, the VR display device 20a) does not retain the terminal information of another VR display device 20 (for example, the VR display device 20b), these VR display devices 20 (the VR display devices 20a, 20b) independently perform image display based on the content data delivered from the server 10.

Figure 9:
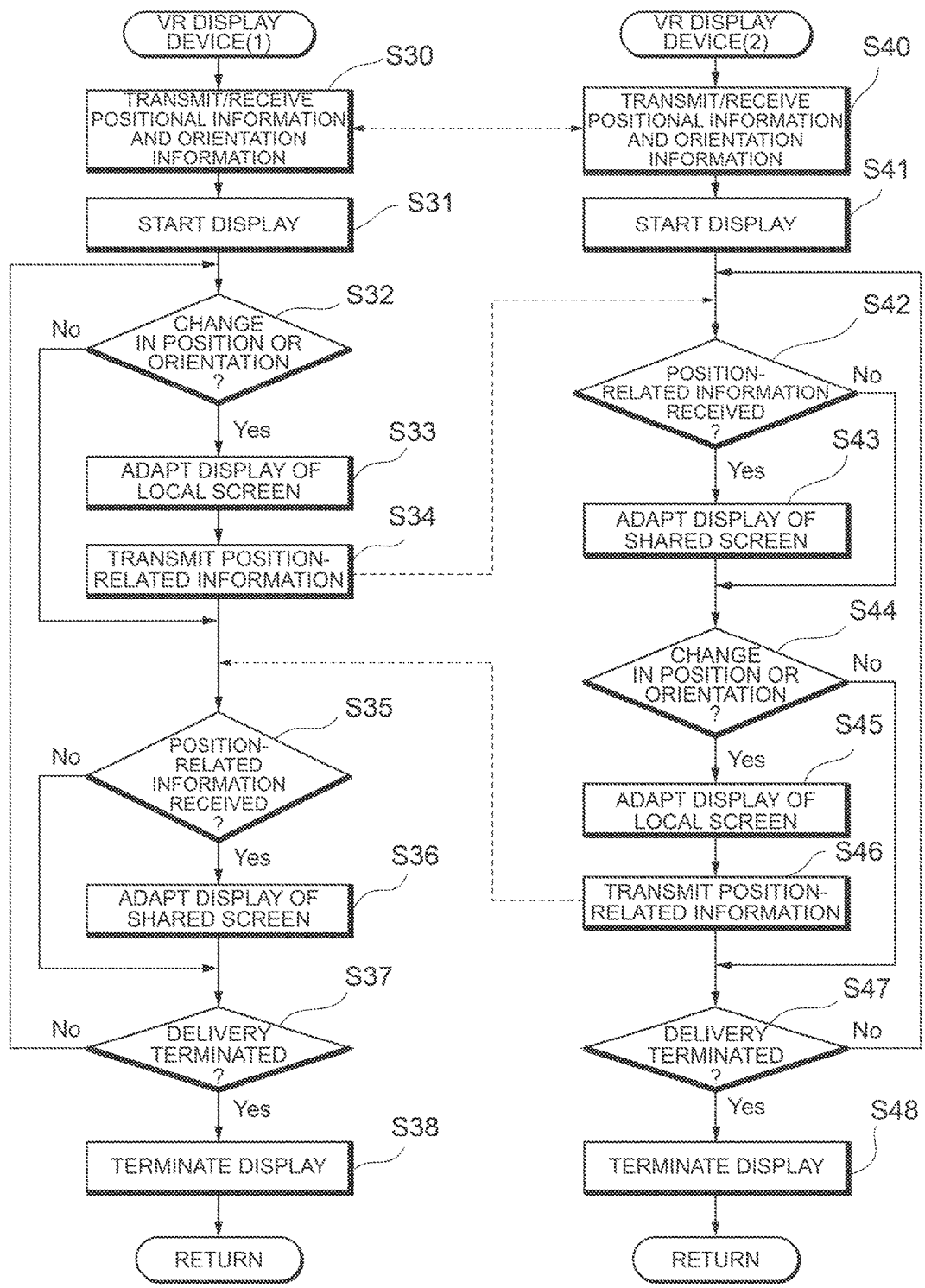
FIG. 9 is a flowchart illustrating the details of the image display processing shown in FIG. 8.

In contrast, when the cooperation is selected in step S23, the VR display device 20 performs image display while sharing information among other cooperating VR display devices 20. FIG. 9 is a flowchart illustrating the operation of the VR display devices 20 in such case. Hereinafter, two cooperating VR display devices 20 will be described by referring to them as a VR display device (1) and a VR display device (2). It should be noted that, even when three or more VR display devices are in cooperation, the operation of the respective VR display devices is similar to that of the VR display device (1) or (2) described below.

First, when the VR display device (1) and the VR display device (2) are made to cooperate, the VR display device (1) and the VR display device (2) transmit/receive positional information and orientation information to/from each other (steps S30, S40). In other words, one's own positional information and orientation information are transmitted, while the other's positional information and orientation information are received. The positional information herein represents a position in a virtual space and each VR display device (1), (2) sets the coordinates in the coordinate axes set in the virtual space as its own initial coordinates in accordance with an input operation by a user. Regarding the orientation information, it can be obtained using an acceleration sensor or a gyroscope sensor, or the like. The VR display devices (1), (2) transmit/receive to/from each other the positional information and orientation information set and obtained in the above-described manners. The transmission/reception of the positional information and orientation information may be performed directly between the VR display device (1) and the VR display device (2) via the communication network N or may be performed indirectly via the server 10.

Figure 10:
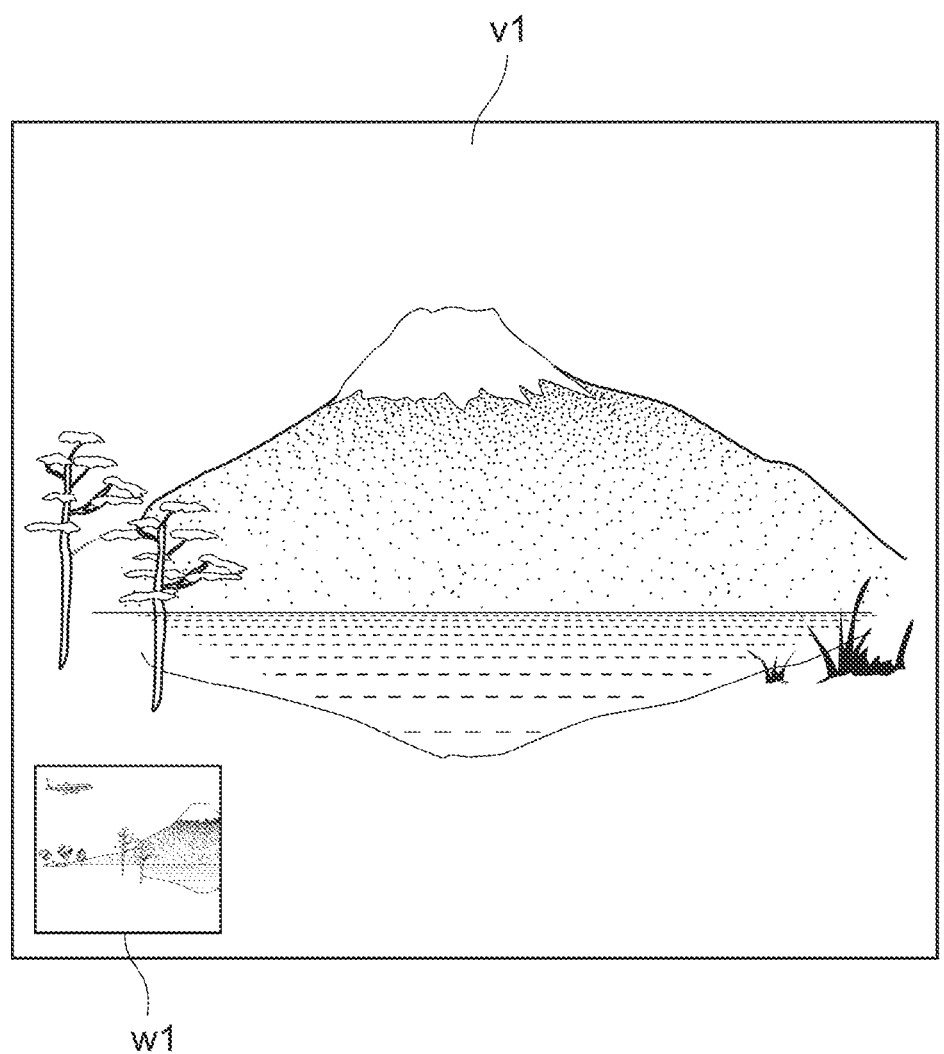
FIG. 10 is a schematic diagram showing an example of a virtual space reproduced in one of two VR display devices which cooperate with each other.

When the content data delivery from the server 10 starts, the VR display devices (1), (2) start image display based on the received content data (steps S31, S41). FIG. 10 shows an example of the virtual space reproduced by the image display in the VR display device (1) and FIG. 11 shows an example of the virtual space reproduced by the image display in the VR display device (2).

As shown in FIG. 10, a window (an image display area) w1, in which the image of the virtual space v2 reproduced in the VR display device (2) is displayed, is provided in part of the virtual space v1 reproduced in the VR display device (1). In the initial state, the image displayed in this window w1 is generated based on the content data delivered from the server 10 to the VR display device (1) and the positional information and orientation information received from the VR display device (2) in step S30. It should be noted that the image displayed in the window w1 may be an image for three-dimensionally reproducing a reduced virtual space v2 or a two-dimensional image obtained by projecting the virtual space v2 onto a plane.

Figure 11:
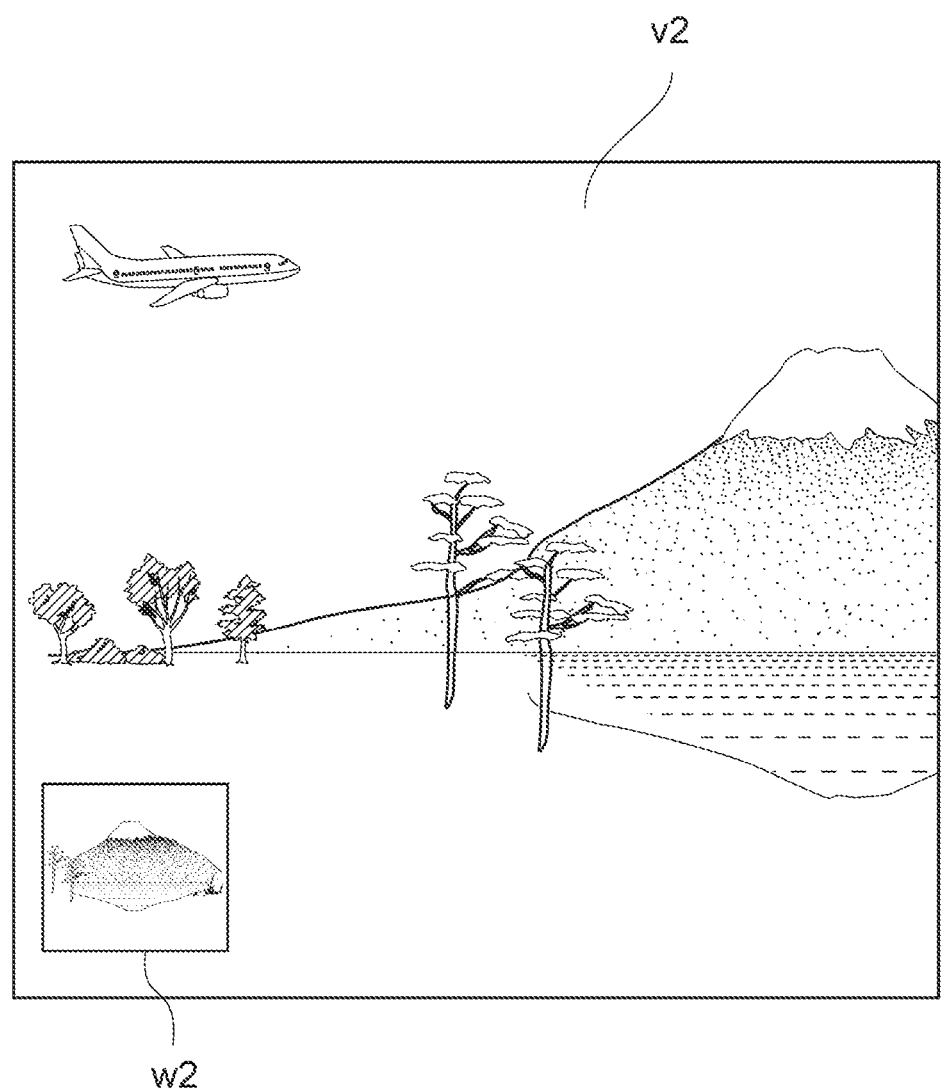
FIG. 11 is a schematic diagram showing an example of a virtual space reproduced in the other one of the two VR display devices which cooperate with each other.

In addition, as shown in FIG. 11, a window (an image display area) w2, in which the image of the virtual space v1 reproduced in the VR display device (1) is displayed, is provided in part of the virtual space v2 reproduced in the VR display device (2). In the initial state, the image displayed in this window w2 is generated based on the content data delivered from the server 10 to the VR display device (2) and the positional information and orientation information received from the VR display device (1) in step S40. It should be noted that the image displayed in the window w2 may be an image for three-dimensionally reproducing a reduced virtual space v1 or a two-dimensional image obtained by projecting the virtual space v1 onto a plane.

In step S32, the position and orientation determining unit 272 (see FIG. 3) of the VR display device (1) determines whether or not there is a change in its own position or orientation. In other words, a determination is made as to whether the user wearing the VR display device (1) has moved or has changed the line of sight.

When there is a change in position or orientation (step S32: Yes), the VR display device (1) adapts and displays the image (the local screen) to be displayed on the display unit 24 in accordance with the change in position or orientation (step S33). More specifically, the position and orientation determining unit 272 converts information (position coordinates, direction and magnitude of acceleration, or the like) related to the movement of the VR display device (1) in the real-life space detected by the movement detection unit 26 (for example, a GPS sensor, an acceleration sensor, a gyroscope sensor, or the like) into information (the same as above) related to the movement in the virtual space, and the local screen control unit 277a adapts the image to be displayed on the display unit 24 such that the frame, orientation, sense of depth, etc. of the object within the virtual space v1 shown in FIG. 10 is adapted in accordance with the converted information related to the movement in the virtual space.

In the subsequent step S34, the VR display device (1) generates information related to the position and orientation (the position-related information) of the VR display device (1) based on the determination result in step S32 and transmits the same to the VR display device (2) (step S34). More specifically, the position-related information generating unit 275 transmits, as the position-related information, information related to the movement of the VR display device (1) in the virtual space obtained by the position and orientation determining unit 272 to the VR display device (2). On the other hand, when a determination is made that neither the position nor the orientation is changed in step S32 (step S32: No), the operation of the VR display device (1) transitions directly to step S35.

When the VR display device (2) receives the position-related information from the VR display device (1) (step S42: Yes), it adapts and displays the image within the window w2 (the shared screen) shown in FIG. 11 based on the received position-related information (step S43). The image displayed in the window w2 after the adaptation is generated based on the content data delivered from the server 10 to the VR display device (2) and the position-related information transmitted from the VR display device (1). In this way, the movement or the change in line of sight of the user wearing the VR display device (1) is reflected in the window w2. When the position-related information is not received in step S42 (step S42: No), the operation of the VR display device (2) transitions directly to step S44.

In step S44, the position and orientation determining unit 272 of the VR display device (2) determines whether there is a change in its own position or orientation. In other words, a determination is made as to whether the user wearing the VR display device (2) has moved or has changed the line of sight. When there is a change in position or orientation (step S44: Yes), the VR display device (2) adapts and displays the image (the local screen) to be displayed on the display unit 24 such that the virtual space v2 shown in FIG. 11 adapts in accordance with the change in position or orientation (step S45). It should be noted that the details of the adapted display operation of the display unit 24 are the same as those of step S33.

In the subsequent step S46, the VR display device (2) transmits the position-related information of the VR display device (2) to the VR display device (1) based on the determination result in step S44 (step S46). The details of the transmission operation of the position-related information are similar to those of step S34. When a determination is made that neither the position nor the orientation is changed in step S44 (step S44: No), the operation of the VR display device (2) transitions directly to step S47.

When the VR display device (1) receives the position-related information from the VR display device (2) (step S35: Yes), it adapts and displays the image within the window w1 (the shared screen) shown in FIG. 10 based on the received position-related information (step S36). The image displayed in the window w1 after the adaptation is generated based on the content data delivered from the server 10 to the VR display device (1) and the position-related information transmitted from the VR display device (2). In this way, the movement or the change in line of sight of the user wearing the VR display device (2) is reflected in the window w1. When the position-related information is not received in step S35 (step S35: No), the operation of the VR display device (1) transitions directly to step S38.

When the content data delivery from the server 10 terminates (step S37: Yes, step S47: Yes), the VR display devices (1), (2) terminate the image display (steps S38, S48). On the other hand, when the content data delivery from the server 10 does not terminate (step S37: No, step S47: No), the operations of the VR display devices (1), (2) respectively return to steps S32 and S42.

Figure 12:
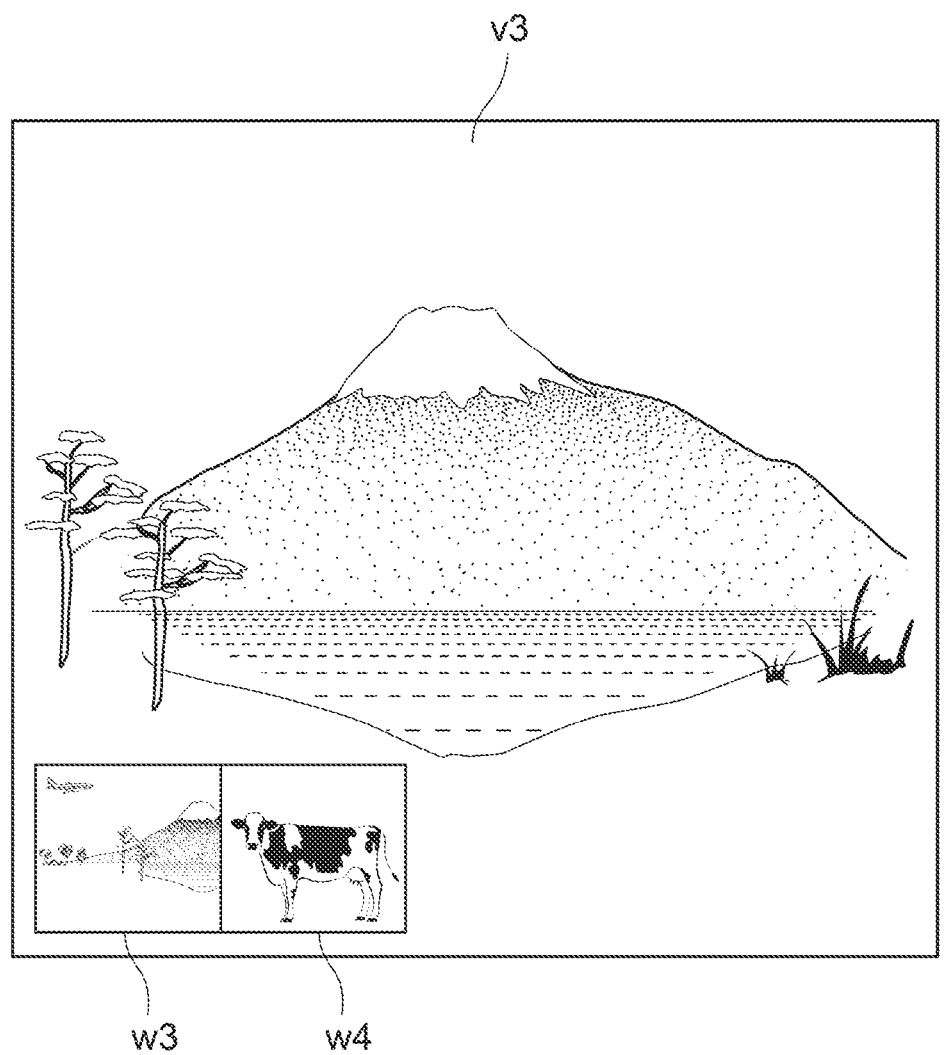
FIG. 12 is a schematic diagram illustrating an image display method when three VR display devices are caused to cooperate.

Here, a case in which two VR display devices (1) and (2) are made to cooperate is described in the above-described embodiment; however, even in a case where three or more VR display devices are made to cooperate, the images may be displayed in a similar manner. For example, FIG. 12 is a schematic diagram illustrating an image display method in a case where three VR display devices are made to cooperate. In this case, windows w3, w4, in which the images of the virtual spaces reproduced in VR display devices other than one's own VR display device are displayed, may be provided in a virtual space v3 reproduced in each VR display device.

Figure 13:
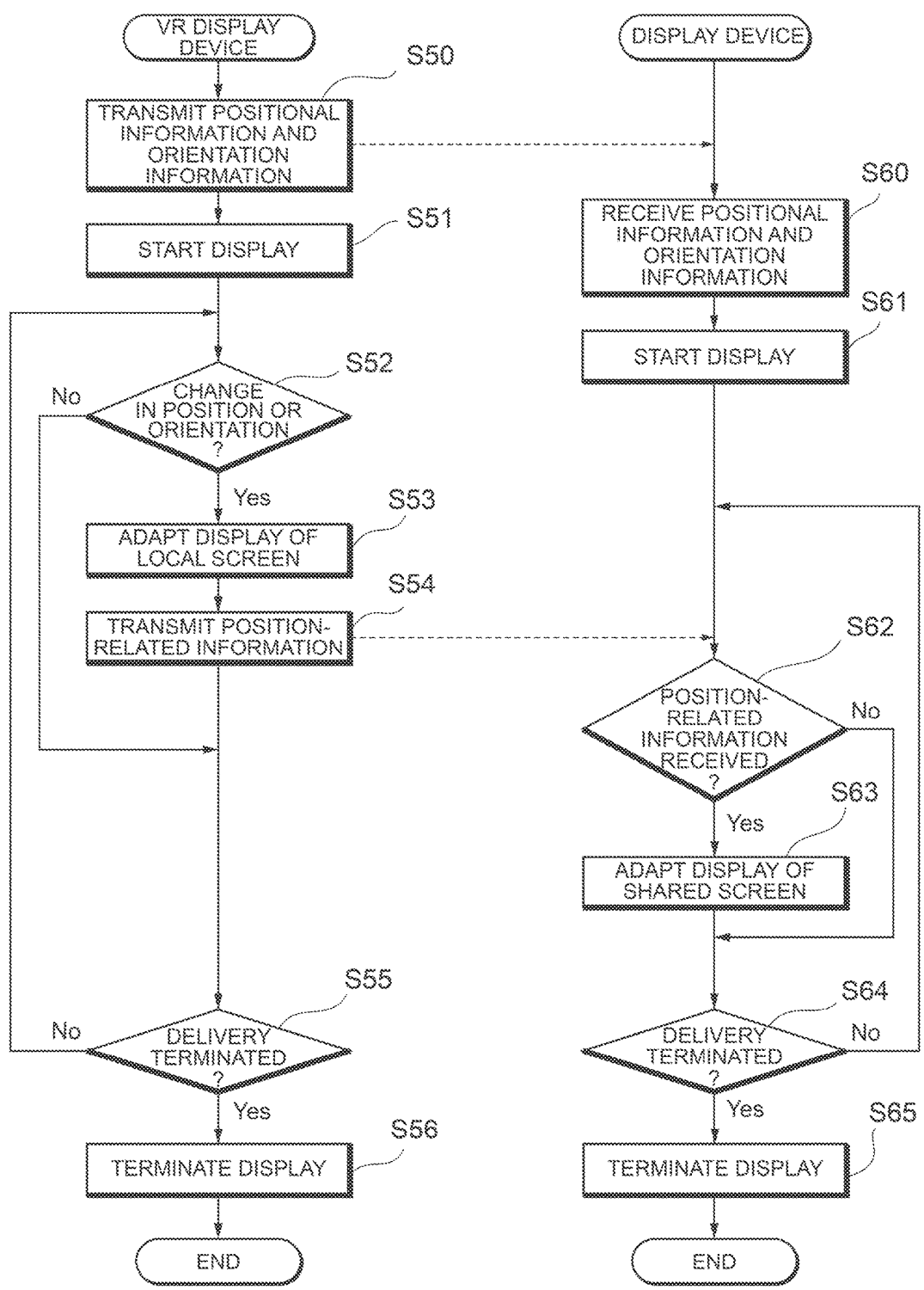
FIG. 13 is a flowchart illustrating the details of the display processing in the VR display device and the display device shown in FIG. 1.

Next, image display processing in a case where the VR display device 20 and the display device 30 are made to cooperate will be described. FIG. 13 is a flowchart illustrating the details of image display processing in the VR display device 20 and the display device 30. Here, in FIG. 13, only the operation of a single VR display device 20 is shown; however, even when a plurality of VR display devices 20 cooperate with the display device 30, the respective VR display devices 20 operate in parallel in accordance with the flow shown in FIG. 13. It should be noted that the operation shown in FIG. 9 is executed among the plurality of VR display devices 20.

Prior to image display, the display device 30 accesses the server 10 as with the VR display device shown in FIG. 8 and makes a request for content, as well as obtains terminal information of the VR display device 20 to be cooperated.

When the cooperation between the VR display device 20 and the display device 30 is established, the VR display device 20 transmits positional information and orientation information to the display device 30 (step S50). The details of the positional information and the orientation information transmitted by the VR display device 20 are similar to those in steps S30, S40. The operations in the subsequent steps S51 to S54 are similar to those in steps S31 to S34 shown in FIG. 9.

Figure 14:
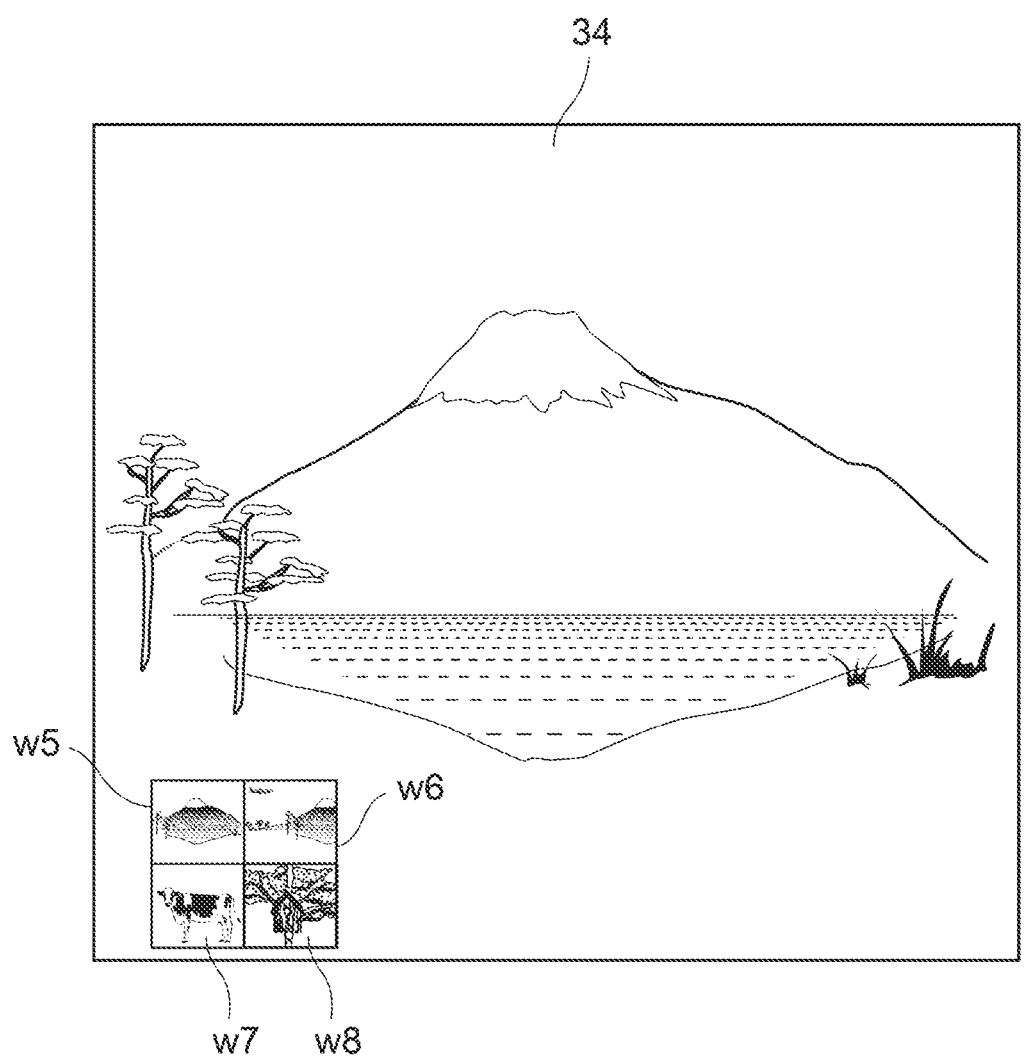
FIG. 14 is a schematic diagram showing an example of a screen displayed on the display device shown in FIG. 1.

In step S60, the display device 30 receives the positional information and the orientation information from the VR display device 20. Subsequently, when the content data delivery from the server 10 starts, the display device 30 starts image display based on the received content data (step S61). FIG. 14 is a schematic diagram showing an example of the screen displayed on the display device 30. As shown in FIG. 14, windows w5 to w8, in which images of virtual spaces reproduced in one or more (four in FIG. 14) cooperating VR display devices 20 are displayed, are provided in part of the screen displayed on the display device 30. In the initial state, the images displayed in these windows w5 to w8 are generated based on the content data delivered from the server 10 to the display device 30 and the positional information and the orientation information transmitted from the respective cooperating VR display devices 20.

When the display device 30 receives the position-related information from the VR display device 20 (step S62: Yes), it adapts and displays the images within the windows w5 to w8 (the shared screen) shown in FIG. 14 based on the received position-related information (step S63). The images displayed in the windows w5 to w8 after the adaptation are generated based on the content data delivered from the server 10 to the display device 30 and the position-related information transmitted from the VR display device 20. In this way, the movement or the change in line of sight of the user wearing the VR display device 20 is reflected in the windows w5 to w8. When the position-related information is not received in step S62 (step S62: No), the operation of the display device 30 transitions directly to step S64.

When the content data delivery from the server 10 terminates (step S55: Yes, step S64: Yes), the VR display device 20 and the display device 30 terminate the image display (steps S56, S65). On the other hand, when the content data delivery from the server 10 does not terminate (step S55: No, step S64: No), the operations of the VR display device 20 and the display device 30 respectively return to steps S52 and S62.

As described above, according to the present embodiment, an image is displayed on an image display device and, with respect to this image, information related to an image displayed on another separate image display device different from the image display device is displayed based on information related to a position and an orientation transmitted from such another image display device, and a user of such image display device can therefore grasp the image that is appreciated by a user of the another image display device. Accordingly, easy communications can be made between users looking at images with personalized display devices such as HMDs.

More specifically, according to the present embodiment, images of virtual spaces reproduced in respective VR display devices 20 are displayed to each other among the cooperating VR display devices 20 and thus, respective users wearing the VR display devices 20 can grasp where the other users are currently casting their glances at and what they are looking at in the virtual space. Therefore, the user can grasp where the other users are casting their glances at and what they are paying attention to even when the view of the real-life space is blocked by the head-mounted display and can understand each other's situation and communicate with each other.

In addition, according to the present embodiment, the VR display device 20 and the display device 30 are made to cooperate and the image of the virtual space reproduced in the VR display device 20 is displayed on the display device 30 and thus, the viewer of the display device 30 can grasp where the user wearing the VR display device 20 is currently casting his/her glance at and what he/she is paying attention to.

Consequently, one-on-one communication between users wearing the VR display devices 20 and/or communication among a plurality of users become(s) possible. In addition, communication between one or more users wearing the VR display device(s) 20 and a multitude of viewers viewing the display device 30 also becomes possible. In this way, sharing of the atmosphere of the place among the users enjoying the same VR content or between them and viewers enjoying the same content on a large screen, etc. becomes easy and this, in turn, can enhance the sense of togetherness and increase the sense of realism.

In addition, according to the present embodiment, only the position-related information is transmitted/received between VR display devices 20 or between a VR display device 20 and a display device 30 and thus, the amount of data transfer can be significantly suppressed as compared to the case where the content data itself is transmitted/received and the shared screens (windows w1 to w8) can be displayed in real-time.

Here, in the above-described embodiment, a case in which an image for reproducing a three-dimensional virtual space in a VR display device 20 is described; however, the image displayed in the VR display device 20 is not limited thereto. For example, part of an image (a video or a still image) having a 360-degree angle of field may be displayed on the display unit 24 and the frame or angle of the image displayed on the display unit 24 may be adapted in accordance with the movement of the VR display device 20.

(First Variation)

In the above-described embodiment, the windows w1 to w8 are provided within the screens of the VR display device 20 and the display device 30, and the images of the virtual spaces reproduced in the cooperating VR display devices 20 are displayed in these windows w1 to w8. However, the virtual spaces reproduced in the cooperating VR display devices 20 may be shown in methods other than the above. For example, in a case where the VR display device 20a and the VR display device 20b are in cooperation, with respect to the virtual space reproduced in one VR display device 20a, an image area (in other words, an image area in the direction which the user is casting his/her glance at) of the virtual space reproduced in the other VR display device 20b may be displayed with a specific color or with a specific pattern being applied thereto based on the position-related information transmitted from such VR display device 20b. Alternatively, an object that indicates such image area, for example, a frame surrounding such image area or an arrow indicating such image area, may be displayed. In this manner, the users of the VR display devices 20a, 20b can share with each other information such as what the partner user is focusing his/her attention on within the virtual space.

(Second Variation)

In the above-described embodiment, the transmission/reception of the position-related information is performed directly between the cooperating display terminals (i.e. between the VR display devices 20 or between the VR display device 20 and the display device 30) via the communication network N. However, the transmission/reception of the position-related information between these display terminals may be performed via the server 10. In this case, each display terminal transmits the position-related information to the server 10 when there is a change in its own position or orientation and then the server 10 transmits the received position-related information to display terminals, other than the display terminal which has sent the position-related information, among the cooperating display terminals.

(Third Variation)

In the above-described embodiment, a group setting is made in advance in the server 10 with respect to a plurality of display terminals, and when requests are made for content with a common identifier from the plurality of display terminals that are set to be in the same group, these display terminals are made to cooperate. However, the method of making a plurality of display terminals cooperate is not limited thereto. For example, a setting may be made in the server 10 to forcibly make a plurality of display terminals cooperate. As an example, an IP range for the display terminals to be cooperated may be specified, and by means of which, a multitude of VR display devices 20 to be used by visitors may be made to cooperate simultaneously in sports live venues, etc., or a plurality of VR display devices 20 to be used by families who paid a visit to preview a property by way of VR may be made to cooperate as needed.

(Fourth Variation)

In the above-described embodiment, the movement (i.e. a change in position and orientation) of the VR display device 20 is detected by the movement detection unit 26 built into the VR display device 20. However, a motion capturing system (for example, KINECT (registered trademark)) that detects the movement of the user with cameras arranged in the real-life space may be used. In such case, the actual movement of the user in the real-life space detected by the motion capturing system is reflected in the positional information and movement information in the virtual space.

(Fifth Variation)

In the above-described embodiment, the image display system 1 is configured by a server 10, a plurality of VR display devices 20 and one or more display device(s) 30. However, the image display system may be configured only by a server 10 and a plurality of VR display devices 20. Alternatively, the image display system may be configured by a server 10, a single VR display device 20 and a display device 30. In such case, the position-related information obtaining unit 276 in the VR display device 20 may be omitted.

The present invention is not limited to the above-described embodiment and first to fifth variations, and various inventions can be made by appropriately combining a plurality of components disclosed in the above-described embodiment and first to fifth variations. For example, inventions can be made by removing certain components from the entirety of the components shown in the embodiment and first to fifth variations, or by appropriately combining the components shown in the embodiment and first to fifth variations.

Further advantages and modifications may be easily conceived of by those skilled in the art. Accordingly, a wider aspect of the present invention is not limited to the particular details and representative embodiment described herein. Accordingly, various modifications can be made to the present invention without departing from the spirit or scope of the general idea of the invention defined by the appended claims and equivalents thereof.

What is claimed is:

1. An image display device to be used in an image display system provided with a plurality of image display devices and a server that delivers data for causing the plurality of image display devices to display images via a communication network, wherein the server stores terminal information that is information for identifying each of the plurality of image display devices and setting information for causing two or more image display devices out of the plurality of image display devices to cooperate, the image display device comprising:

a data obtaining unit that obtains the data from the server;

a display unit that displays an image based on the data;

a display control unit that controls image display in the display unit;

a position and orientation determining unit that determines a position change and an orientation of the image display device;

a position-related information generating unit that generates and transmits information related to a position and an orientation of the image display device based on a result of determination made by the position and orientation determining unit; and a position-related information obtaining unit that obtains information related to a position and an orientation of at least one image display device, other than the image display device, out of the two or more image display devices that are caused to cooperate based on the setting information, the information being transmitted from the at least one image display device, wherein the display control unit causes the display unit to display an image based on the data obtained by the data obtaining unit and adapts the image in accordance with a position and an orientation of the image display device based on a result of determination made by the position and orientation determining unit, and further causes the display unit, based on the information related to a position and an orientation obtained by the position-related information obtaining unit, to display information related to an image displayed on an image display device that transmitted the information related to a position and an orientation.

2. The image display device according to claim 1, wherein the display control unit causes an area within the image that is displayed so as to be adapted in accordance with a position and an orientation of the image display device to display an image displayed on the at least one image display device.

3. The image display device according to claim 1, wherein the display control unit displays an area by applying a specific color or pattern thereto, the area being corresponding to an image displayed on the at least one display device within an image that is displayed so as to be adapted in accordance with a position and an orientation of the image display device.

4. The image display device according to claim 1, wherein the display control unit displays an object that indicates an area corresponding to an image displayed on the at least one image display device with respect to an image that is displayed so as to be adapted in accordance with a position and an orientation of the image display device.

5. The image display device according to claim 1, wherein the data includes data for displaying a two-dimensional image in the image display device.

6. The image display device according to claim 1, wherein the data includes data for reproducing a three-dimensional virtual space in the image display device.

7. The image display device according to claim 1, wherein the data includes modeling data for displaying computer graphics in the image display device.

8. The image display device according to claim 1, further comprising a holder for mounting the image display device onto a user's head.

9. The image display device according to claim 1, wherein
the server transmits terminal information of an image display device other than the image display device out of the two or more image display devices to each of the two or more image display devices that are caused to cooperate based on the setting information,
the position-related information generating unit transmits, without going through the server, the generated information related to a position and an orientation to an image display device corresponding to terminal information received from the server.

10. An image display system, comprising:
a plurality of image display devices; and
a server that delivers data for causing the plurality of image display devices to display images via a communication network,
wherein the server includes:
a storage unit that stores the data;
a database that stores terminal information that is information for identifying each of the plurality of image display devices and setting information for causing two or more image display devices out of the plurality of image display devices to cooperate; and
a data delivery unit that performs synchronous delivery of the data to the two or more image display devices that are caused to cooperate based on the setting information,
wherein each of the plurality of image display devices includes:
a data obtaining unit that obtains the data from the server;
a display unit that displays an image based on the data;
a display control unit that controls image display in the display unit;
a position and orientation determining unit that determines a position change and an orientation of the image display device;
a position-related information generating unit that generates and transmits information related to a position and an orientation of the image display device based on a result of determination made by the position and orientation determining unit; and
a position-related information obtaining unit that obtains information related to a position and an orientation of at least one image display device, other than the image display device, out of the two or more image display devices that are caused to cooperate based on the setting information, the information being transmitted from the at least one image display device,
wherein the display control unit causes the display unit to display an image based on the data obtained by the data obtaining unit and adapts the image in accordance with a position and an orientation of the image display device based on a result of determination made by the position and orientation determining unit, and further causes the display unit, based on the information related to a position and an orientation obtained by the position-related information obtaining unit, to display information related to an image displayed on an image display device that transmitted the information related to a position and an orientation.

11. The image display system according to claim 10, wherein
the server further includes a cooperation setting unit that transmits terminal information of an image display device, other than the image display device out of the two or more image display devices, to each of the two or more image display devices that are caused to cooperate based on the setting information, and
the position-related information generating unit transmits, without going through the server, the generated information related to a position and an orientation to an image display device corresponding to the terminal information received from the server.

12. The image display system according to claim 10, further comprising at least one second image display device that is connected to the server and at least one of the plurality of image display devices via the communication network,
wherein the server further stores terminal information that is information for identifying the at least one second image display device,
the setting information includes information for further causing the at least one second image display device to cooperate with the two or more image display devices that are caused to cooperate,
the at least one second image display device includes:
a second data obtaining unit that obtains the data from the server;

a second display unit that displays an image based on the data;

a second display control unit that controls image display in the second display unit; and a second position-related information obtaining unit that obtains information related to a position and an orientation of at least one image display device that is in cooperation with the second image display device based on the setting information, the information being transmitted from the at least one image display device, wherein the second display control unit causes the second display unit to display an image based on the data obtained by the second data obtaining unit and causes the second display unit, based on the information related to a position and an orientation obtained by the second position-related information obtaining unit, to display information related to an image displayed on an image display device that transmitted the information related to a position and an orientation.

13. An image display system, comprising:

at least one first image display device;

at least one second image display device that is different from the first image display device; and a server that delivers data for causing the at least one first and second image display devices to display images via a communication network, wherein the server includes:

a storage unit that stores the data;

a database that stores terminal information that is information for identifying each of the at least one first and second image display devices and setting information for causing two or more image display devices out of the at least one first and second image display devices to cooperate, the two or more image display devices including one of each of at least first and second image devices, and a data delivery unit that performs synchronous delivery of the data to the two or more image display devices that are caused to cooperate based on the setting information, wherein the at least one first image display device includes:

a first data obtaining unit that obtains the data from the server;

a first display unit that displays an image based on the data;

a first display control unit that controls image display in the first display unit;

a position and orientation determining unit that determines a position change and an orientation of the first image display device; and a position-related information generating unit that generates and transmits information related to a position and an orientation of the first image display device based on a result of determination made by the position and orientation determining unit, wherein the at least one second image display device includes:

a second data obtaining unit that obtains the data from the server;

a second display unit that displays an image based on the data;

a second display control unit that controls image display in the second display unit; and a position-related information obtaining unit that obtains information related to a position and an orientation of a first image display device that is included in the two or more image display devices that are caused to cooperate based on the setting information, the information being transmitted from the first image display device, wherein the first display control unit causes the first display unit to display an image based on the data obtained by the first data obtaining unit and adapts the image in accordance with a position and an orientation of the first image display device based on a result of determination made by the position and orientation determining unit, wherein the second display control unit causes the second display unit to display an image based on the data obtained by the second data obtaining unit and causes the second display unit, based on the information related to a position and an orientation obtained by the position-related information obtaining unit, to display information related to an image displayed on the first image display device that transmitted the information related to a position and an orientation.

14. The image display system according to claim 13, wherein the server further includes a cooperation setting unit that transmits terminal information of an image display device, other than the image display device out of the two or more image display devices, to each of the two or more image display devices that are caused to cooperate based on the setting information, and the position-related information generating unit transmits, without going through the server, the generated information related to a position and an orientation to an image display device corresponding to terminal information received from the server.

* * * * *